United States Patent [19]
Chabanne et al.

[11] Patent Number: 5,496,080
[45] Date of Patent: Mar. 5, 1996

[54] LOCK WITH PREFERABLY AUTOMATIC LATCHING AND ITS USE ESPECIALLY FOR A REMOVABLE VEHICLE SEAT

[75] Inventors: Jean-Pierre Chabanne, Champvallon; Gerard Anglade, Pannes; Jean-Marie Blanchard, Sur Vernisson; Francois Fourrey, Montbeliard, all of France

[73] Assignee: CESA-Compagne Europenne De Sieges Pour Automobiles, Levallois-Perret, France

[21] Appl. No.: 172,071

[22] Filed: Dec. 23, 1993

[30] Foreign Application Priority Data

Dec. 29, 1992 [FR] France ................................... 92-15857

[51] Int. Cl.$^6$ ...................................................... B60N 2/10
[52] U.S. Cl. .......................... 292/252; 296/65.1; 296/69; 403/325; 403/322
[58] Field of Search .................... 296/65.1, 69; 403/325, 403/322, 321; 292/252; 70/34, 386; 5/118; 297/331, 336, 335

[56] References Cited

U.S. PATENT DOCUMENTS

| | | | |
|---|---|---|---|
| 1,935,715 | 11/1933 | Hunt et al. | 292/252 |
| 2,898,797 | 8/1959 | Bronstein . | |
| 3,233,496 | 2/1966 | Pew et al. . | |
| 3,478,548 | 11/1969 | Finck, Jr. | 70/386 |
| 3,807,790 | 4/1974 | Erard | 297/331 X |
| 3,980,327 | 9/1976 | Duran | 292/252 |
| 4,016,914 | 4/1977 | Zurko . | |
| 4,111,477 | 9/1978 | Rigali | 292/252 |
| 4,759,580 | 7/1988 | Berklich, Jr. et al. | 296/65.1 |
| 4,840,049 | 6/1989 | Russo | 70/386 |
| 4,884,843 | 2/1989 | De Rees | 297/336 |
| 5,021,624 | 7/1991 | Agbay et al. | 70/386 |
| 5,098,141 | 3/1992 | Bull . | |
| 5,207,544 | 5/1993 | Yamamoto et al. | 292/252 |
| 5,238,285 | 8/1993 | Holdampf et al. | 297/336 |
| 5,282,662 | 2/1994 | Bolsworth et al. | 297/331 X |
| 5,326,067 | 7/1994 | Gonzalez | 296/65.1 |

FOREIGN PATENT DOCUMENTS

| | | | |
|---|---|---|---|
| 1181112 | 1/1985 | Canada . | |
| 747277 | 12/1944 | Germany . | |
| 2251183 | 7/1992 | United Kingdom | 297/336 |

*Primary Examiner*—Darnell M. Boucher
*Attorney, Agent, or Firm*—Sughrue, Mion, Zinn, Macpeak & Seas

[57] ABSTRACT

The expanding and retracting ball- and broach-type lock comprises a striker plate (10), a catch bolt (20), a control device (30), an orientation device, a position detector, a safety device, a safety feature and, preferably, an ejector (80).

The lock is mounted on a support (90) such as a seat subframe with a sole-plate (91) and a leg (92) which are articulated in order to rock relative to each other.

Use for a removable of a "single-volume people-carrier type" vehicle seat.

16 Claims, 9 Drawing Sheets

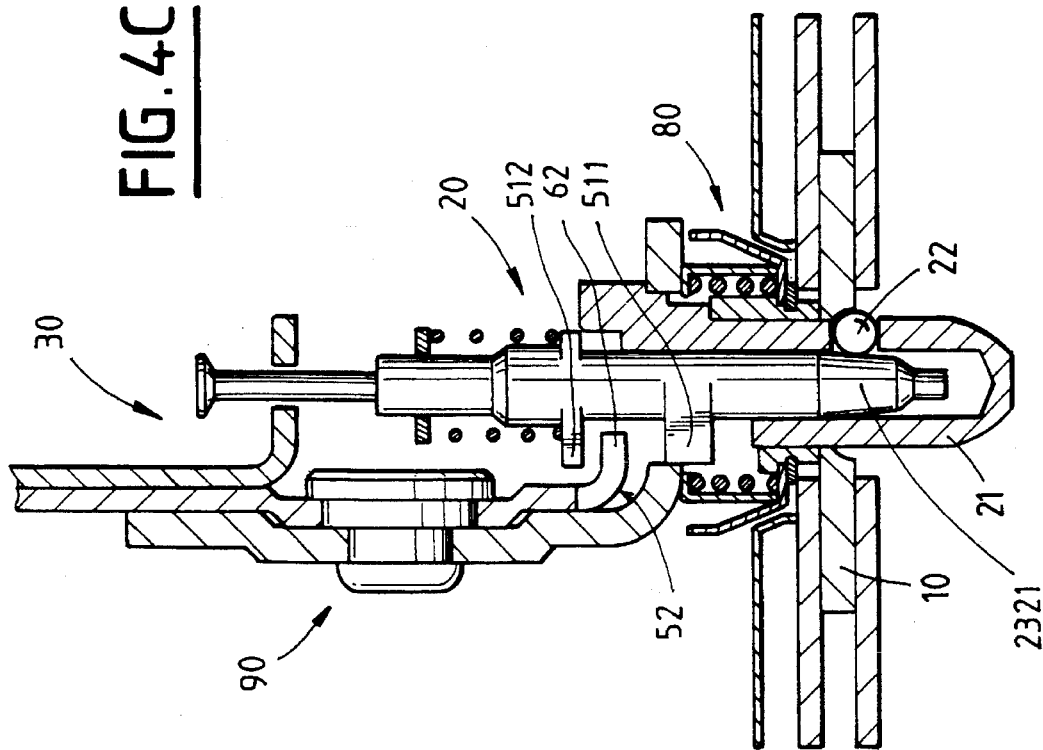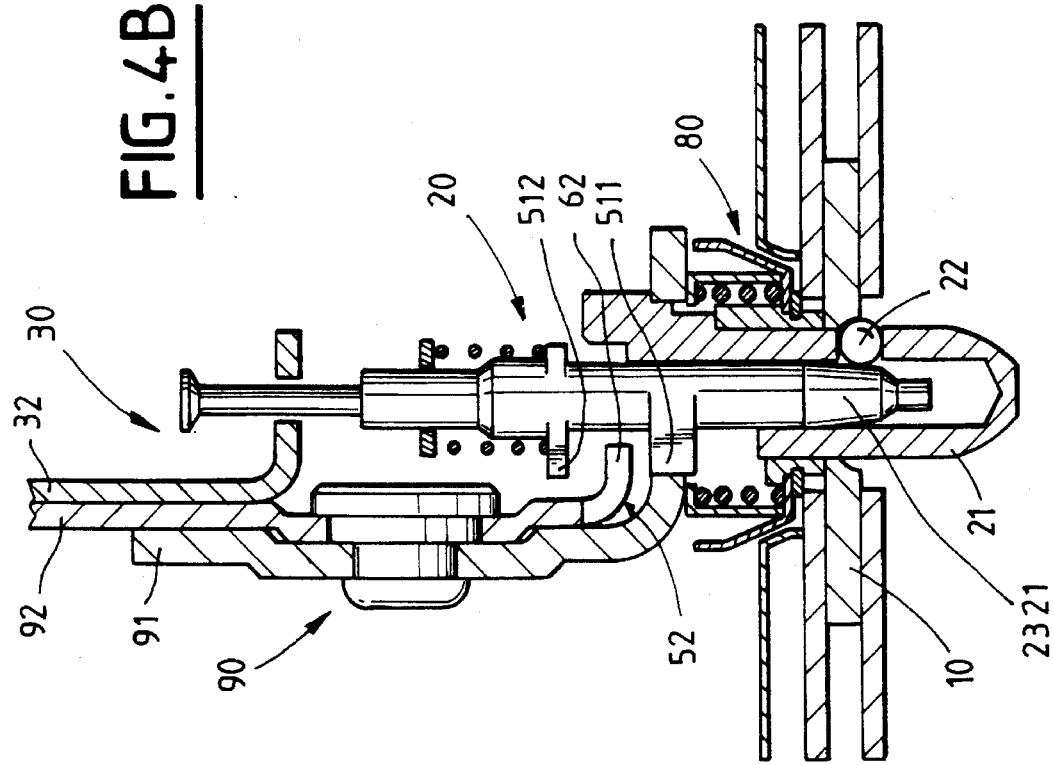

LOCK WITH PREFERABLY AUTOMATIC LATCHING AND ITS USE ESPECIALLY FOR A REMOVABLE VEHICLE SEAT

BACKGROUND OF THE INVENTION

The present invention relates to fixing or anchoring device for holding down, in a removable and reliable manner, an object on a surface, such as, for example a land-going motor vehicle seat on the floor of the former.

In many technical sectors, it is necessary to hold down, in a fail-proof manner, an object on a surface. Such is the case, for example, for land-going motor vehicles called "single-volume people-carrier type" vehicles which derive both from the internal compartment called an estate and from the utility vehicle called a small van. Given the universality of use intended for these vehicles, it is necessary to equip them with removable seats capable of assuming multiple and varied positions, which are preferably predetermined, that is to say, each capable of assuming a certain number of positions which positions are separate and well-defined.

Seats of this type must, for example, be able to be opened out completely as a bunk, as a relaxation chair or "lounger", as a normal so-called driving or travelling seat or to be partially opened out as a shelf. They must also be able to be retracted in order to be folded partially or to be folded up totally in a compact and relatively unbulky manner and with a view to concealing them in the vehicle or to removing them from the latter.

For such an application, it is therefore necessary to have available a system for anchoring and locking to the floor of the vehicle, with easy handling, which is such that a seat installed on the floor can effectively be occupied only when the system is not only locked but also confined in such a manner as to render it unfailing.

Indeed, for safety reasons, especially in the event of violent impacts having a large longitudinal component, determined in relation to the vehicle, it is necessary for the seat not to give way under its occupant or even be driven by the latter should the seat belt which equips the seat be no longer directly anchored at two or three points in the structure or body shell of the vehicle, but, on the contrary, this belt forms part of the seat and is as it were "on-board" on the latter, the various points of anchorage of the seat belt being set up directly on the seat itself. It is understood that the forces to be absorbed and/or to be transmitted in the event of impacts are essentially localised, especially in the area of the subframe of the frame and of the floor of the vehicle, as well as at their junction.

It is understood that there is every possible difficulty in satisfying all these, often contradictory, requirements, in particular when it is recalled that such a system has to be produced in high volume and at the lowest cost, and this must be achieved in a particularly reliable manner.

SUMMARY OF THE INVENTION

The object of the invention is to produce an expanding and retracting ball- and broach-type lock, with automatic latching, which is suitable in all cases where it is necessary to lock and unlock two parts rapidly, one in relation to the other, under optimal safety conditions.

The lock according to the invention, which is suitable especially for immobilizing a vehicle seat onto the floor of the former, has the particular features:

of rapid locking and unlocking;

of clicking-in, preferably automatically, by pressing and manual unlocking by acting on a control device;

of incorrect clicking-in and/or anchoring to the floor, preventing the seat from being used, indicated by means of safety indicators;

of the manufacturing tolerances and operational clearances being taken up and, if required, of a wear limit being indicated;

as well as, if required and preferably, of its essential components being protected from impacts and dirt.

The subject of the invention is an expanding and retracting ball- and broach-type lock, preferably with automatic latching, especially formed, on the one hand, by a striker plate with two opposite faces transpierced by an opening with a clear passage bordered by a set-back contact area and, on the other hand, by a catch bolt made of a hollow elongate locking body with a cylindrical guide cavity and an open extremity as well as with at least one channel transpiercing this body in order to come out into its cavity, by at least one ball housed in the channel in order to be retained therein such that it can move between a first position in order to project partially outside of the body so as to be able to encounter the contact area in order to lock the catch bolt on the striker plate and a second position, retracted into the body so as to become separated from the contact area in order to unlock the catch bolt from the striker plate, by a needle housed in the cavity such that it can move between an active position and an inactive position with a cylindrical shaft, with an inner end formed by a truncated cone converging on a pilot in order to cause the ball to pass from one of its positions to the other and with an outer end, as well as by a control device connected to this outer end in order to move the needle in the body. This lock is also formed by an elastic urging member interposed between body and needle in order to act on the latter so as to tend to bring it into its active position in such a manner as to place the ball in its first position, the control device acting in opposition to this elastic urging member so as to place the needle in its inactive position in order to allow the ball to pass from its second to its first position in such a manner as to release the lock in order to be able to separate catch bolt and striker plate.

This lock is noteworthy in that the truncated cone comprises two successive regions of different respective angles in order to compensate for the clearance between striker plate and catch bolt.

The subject of the invention is also the application of a lock of this type to a removable land-going motor vehicle seat in order to immobilize this seat on the floor of the vehicle.

Other characteristics of the invention will emerge from reading the description and claims which follow, as well as from examining the appended drawing, given solely by way of example, in which:

BRIEF DESCRIPTION OF THE DRAWING

FIGS. 4A, 4B, 4C, 4D and 4E are partial views, which are virtually analogous as that of FIG. 3, in various operational states.

DESCRIPTION OF PREFERRED EMBODIMENTS

Figure 1:
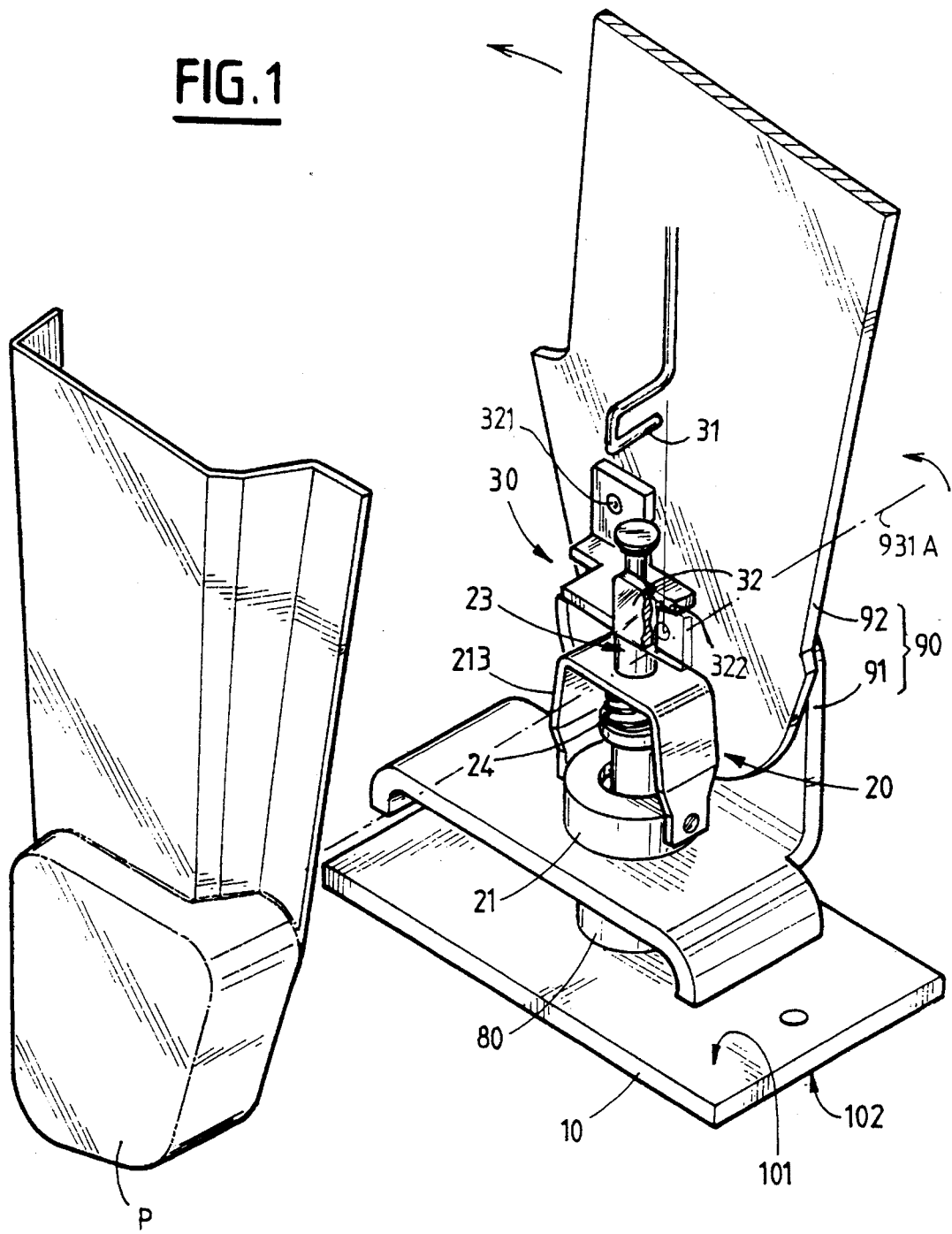
FIG. 1 is a perspective view of one embodiment of a lock according to the invention, in its use for a land-going motor vehicle seat.

Since expanding and retracting ball- and broach-type locks, especially with automatic latching, as well as the seats of land-going motor vehicles are well known in the art, a description will be made below only of that which relates, directly or indirectly, to the invention, For the rest, the person skilled in the art in question will be able to draw on standard conventional solutions at his disposal in order to deal with the particular problems with which he is confronted.

Hereinafter, the same reference number is always used to identify an equivalent element regardless of the embodiment or its variant.

For the convenience of the explanation, each of the components of a lock according to the invention in its particular application to a land-going motor vehicle seat will be described in turn before explaining the manufacture, if required, and the operation thereof, As may be seen, an expanding and retracting ball- and broach-type lock, preferably with automatic latching, according to the invention comprises, essentially, a striker plate 10, a catch bolt 20, a control device 30, an orientation device 40, a position detector 50, a safety device 60, a safety feature 70 and preferably an ejector 80. This lock is intended to be mounted on a support 90.

Figure 3:
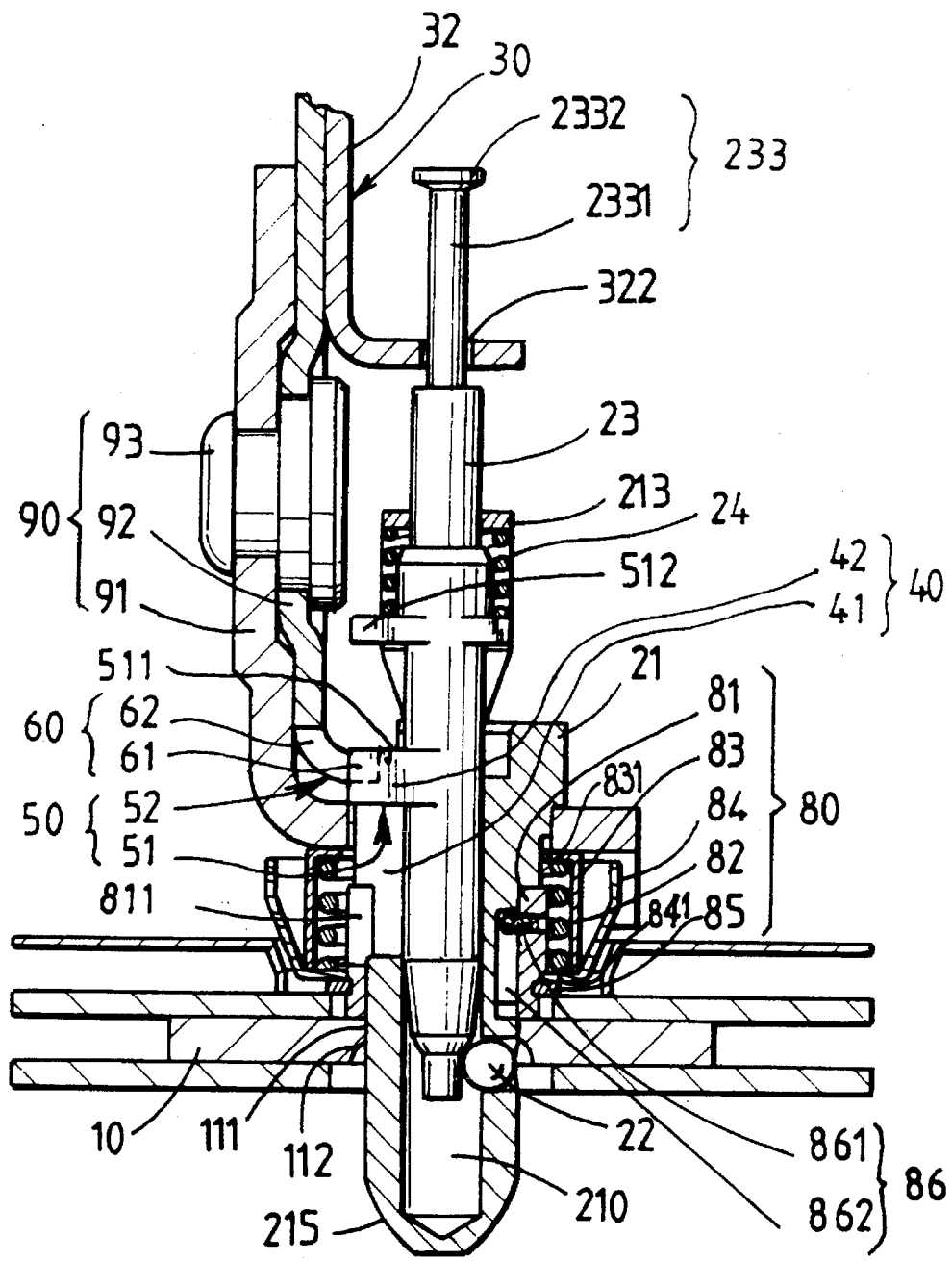
FIG. 3 is a diagrammatic longitudinal section of the embodiment of FIG. 1, in the latched non-locked position.

The striker plate 10, made for example from a plate of suitable sheet metal, is intended to be fixed to a vehicle floor, especially between two partitions in this floor, as illustrated and not referenced in FIG. 3. The striker plate 10 comprises a bearing face 101 and a locking face 102. The striker plate 10 is transpierced, right through, by an opening 11 with a free passage III and a contact area 112 set back for the reasons which will be subsequently understood. This contact area 112 is, for example, like an annular chamfer or a depression or the like.

The catch bolt 20, in the form of a broach, essentially comprises a locking body 21, at least one ball 22, a needle 23 and an elastic urging member 24.

The locking body 21 is elongate and hollow, and has a cylindrical guide cavity 210 as well as an open extremity 211. The body 21 is provided with at least one channel 212 transpiercing it in order to come out into the cavity 210, as illustrated. This channel is preferably radial. At least three equidistant identical channels are preferably used. A shackle 213 sits, as illustrated, some distance above the open extremity 211 of the body for reasons which will be subsequently understood. The body 21 also has a flange 214 in the vicinity of its open extremity 211, and is terminated at its opposite extremity by a tip 215, preferably closed and of conical or spheroidal configuration for the reasons which will be subsequently apparent. At least one ball 22 is housed in each channel in order to be retained therein such that it can move between a first position in order to project partially outside from a body so as to be able to encounter the contact area 112 in such manner as to lock the catch bolt 20 onto the striker plate 10, and a second position, retracted into the body so as to become separated from the contact area 212 in such a manner as to unlock the catch bolt 20 from the striker plate 10. The balls are retained in the channels, for example by crimping or the like.

The needle 23 is housed such that it can move in the cavity 210 between an active position in which it is capable of causing the balls to project into their first position and to keep them in this position, and an inactive position for Which the balls may assume their second, retracted position. The needle 23 comprises a cylindrical shaft 231 with, preferably, a shoulder 2311, an inner end 232 formed by a truncated cone 2321 with at least two regions of different angles, converging on a pilot 2322. For reasons which will be subsequently understood, a region of relatively large angle is connected to the pilot and a region having a relatively very small angle is connected to the shaft. The two regions of different angles of the truncated cone are contiguous and are connected directly or alternatively are some distance from each other and then connected by a cylindrical portion, the axial length of which is approximately of the order of the axial length of that region of the truncated cone having a large angle. This truncated cone and this pilot make it possible to cause the balls to pass from one of their two positions to the other. The needle also comprises an outer end 233 with a rod 2331 terminated by a head 2332 or the like for reasons which will subsequently be apparent.

The elastic urging member 24 is interposed between the body 21 and the needle 23 in order to act on the latter so as to urge it towards its active position in such a manner as to tend to place the ball or balls in their first position. This elastic urging member is formed, for example, by a cylindrical helical or coil spring interposed between the shackle 213 and the shoulder 2311 as illustrated.

Figure 2:
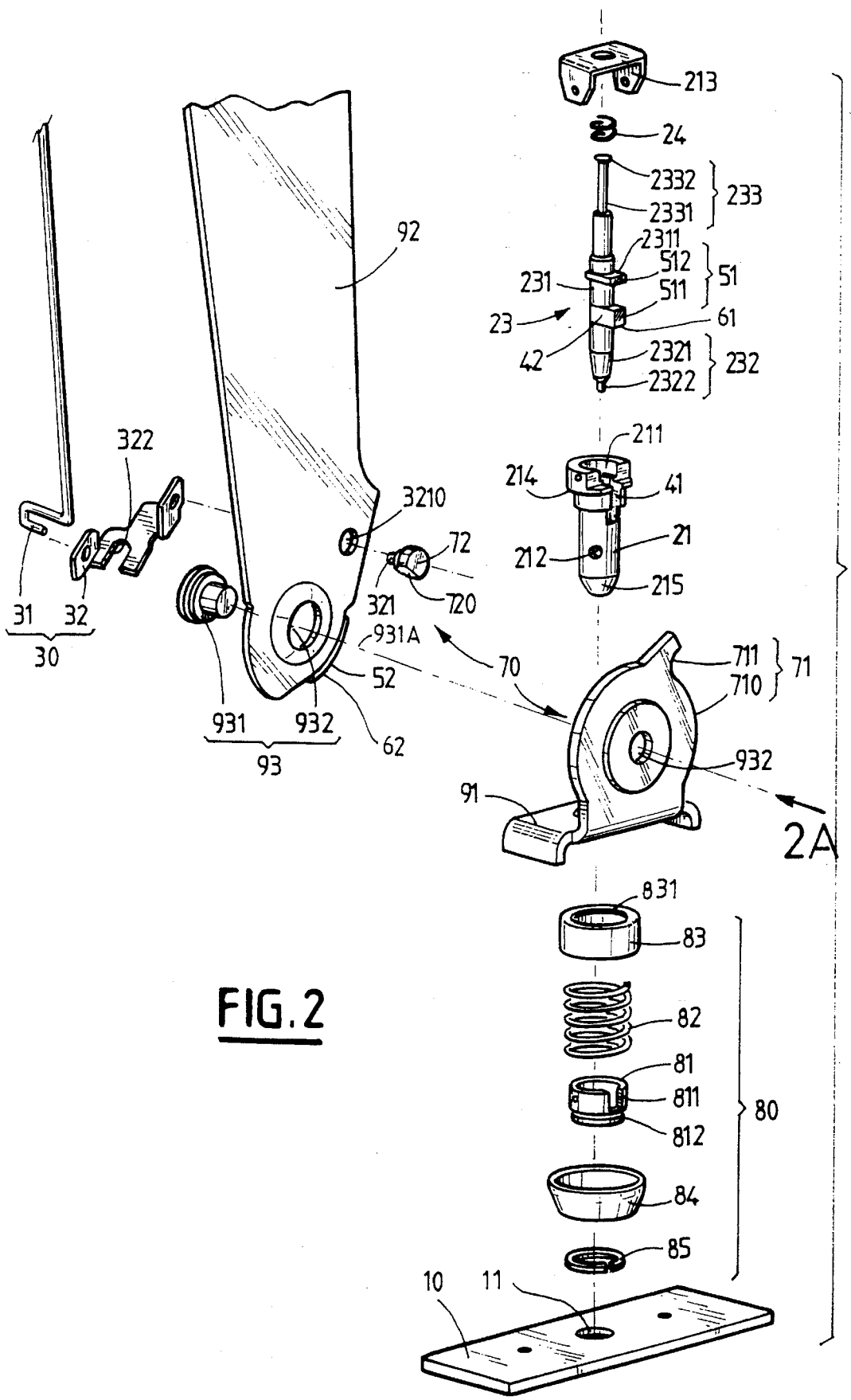
FIG. 2 is an exploded perspective view of the embodiment of FIG. 1, but seen from the opposite side.
Figure 2A:
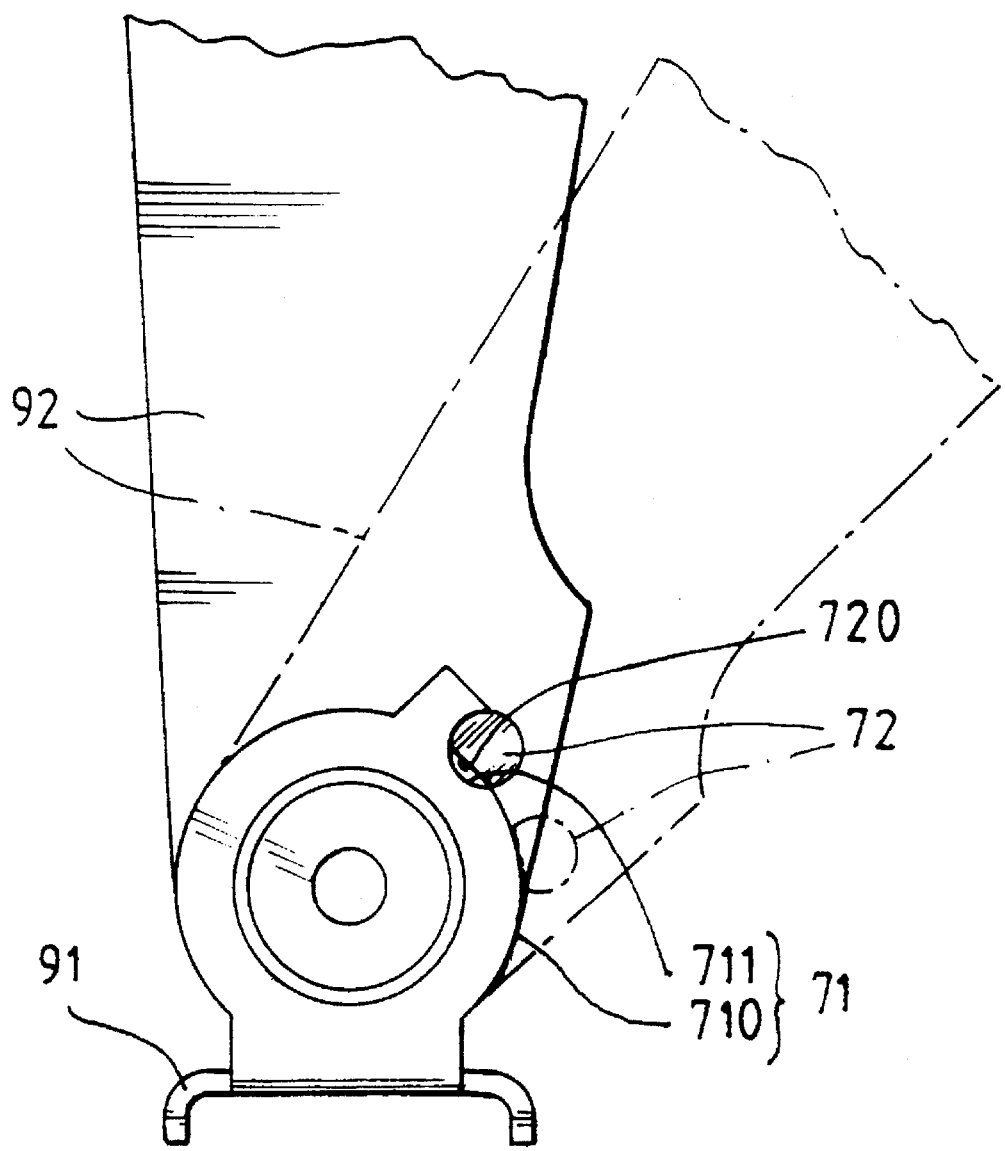
FIG. 2A is a view in the direction of arrow 2A in FIG. 2.

The control device 30, which can preferably be connected and disconnected at will for reasons which will subsequently be apparent, comprises, for example, a puller 31 or the like on which it is possible to act manually and a lever 32 which is mounted so as to rock on a peg 321 and is provided with an open fork 322 at one of its extremities. The fork 322 is intended to sit astride the rod 2331 of the outer end 233 of the needle 23, beneath the head 2332. The puller 31 is, for example, made from a metal rod terminated by a hook engaged in a suitable eye in the lever, as clearly illustrated in FIG. 2.

The orientation device 40, for keeping relatively fixed, in rotation, the body 21 and the needle 23, is, for example, of the tongue-and-groove type. For the embodiment illustrated, the groove 41 is made on the body 21 and the tongue 42 is carried by the needle 23. This orientation device allows the needle to slide axially in the body.

The detector 50 for detecting the position of the needle 23 is formed by a movable member 51 which is carried by the needle 23, and by a reference member 52 which is placed in the path of the movable member 51. The reference member 52 is, for example, associated with the support 90 which will be mentioned again subsequently and to which the body 21 is fixed. This detector 50 serves as an indicator for indicating either (a) that the catch bolt 20 is completely engaged in the striker plate 10 without actually being locked therein, the needle 23 in the inactive, position not driving the balls 22 from their first position (FIGS. 4A–5A), or (b) that the catch bolt 20 is incompletely engaged in the striker plate 10 and is locked, the needle 23 in the active position driving the balls 22 into their first position (FIGS. 4D–5D). In the embodiment illustrated, the movable member 51 is a limit stop made on the shaft 231. Preferably, this limit stop is duplicated in order to make a "bottom" limit stop 511 for indicating the inactive position of the needle 23 (FIGS. 4A–5A) and a "top" limit stop 512 for indicating the active position of the needle 23 (FIGS. 4D–5D).

In the particular application illustrated, the support 90, to which the body 21 of the catch bolt 20 is fixed, comprises a first part 91 which carries the body 21 and a second part 92 which is joined to the first part 91 by an articulation 93 with a pin 931 having an axis 931A orthogonal to the axis of the cavity 210 of the body 21. It is this second part 92 which carries the reference member 52 which is in the form of a stop-piece obtained, for example, with the aid of a bent-over rim on the second part 92 and centred on the pin 931. The pin 931 is engaged in bearings 932 made on each of the two parts 91, 92 of the support 90. This is clearly illustrated in the figures of the drawing. The second part 92 can move, relative to the first part 91, between an opened-out position and a folded or folded-up position which correspond, for example, to the configurations of a seat, respectively in order to render it suitable to receive a seated occupant or to be able to be disengaged from the vehicle by separation from the floor. This support forms, for example, part of the subframe of the frame of the seat, the leg of which is formed by the second part 92 and the sole-plate of this leg of which, intended to rest on the floor, is formed by the first part 91.

The safety device 60 prevents the tilting of the second part 92 of the support relative to the first part 91 of the latter, in order to pass from its folded or folded-up position to its opened-out position, by interacting with the position detector 50, if the lock is in a state where there is a correct complete engagement fault or satisfactory locking fault. The safety device 60 comprises two interacting complementary elements 61, 62. One, 61, of these elements is preferably a protuberance associated with the movable member 51 of the detector and the other, 62, of these elements is preferably a stop-piece 62 associated with the reference member 52 of the detector. By examining the figures of the drawing, it may be seen that the second part 92 rocks only when the stop-piece 52/62 does not lie facing one of the limit stops 511, 512 (FIGS. 4B, 4C or FIGS. 5B, 5C). Conversely, if the stop-piece 52/62 is facing one or other of the limit stops 511, 512 (FIGS. 4A, 4D or FIGS. 5A, 5D), any attempt to tilt the second part is thwarted by the stop-piece 52/62 encountering that one of the limit stops 511, 512 which intercepts its path.

The safety feature 70 is arranged to neutralize the control device 30 so as to prevent the release of the lock when the second part 92 of the support is not in its opened-out position and, in addition, to connect the control device 30 to the outer end 233 of the needle 23 automatically when the second part 92 of the support passes from its folded or folded-up position to its opened-out position. This safety feature comprises a cam 71 and a cam follower 72. The cam 71 is carried by the first part 91 of the support 90 and is in the form of a circular arc 710 centred on the pin 931 with an undercut 711 at one of its extremities. At least one of the extremities of the cam is fitted with stop which fixes the maximum amplitude of the tilting of the second part 92 relative to the first part 91. The cam follower 72 is formed by a flat 720 made on the peg 321 carrying the rocking lever 32 of the control device. The peg 321 swivels freely in a hole 3210 of the second part 92, while the lever 32 is rotationally clamped onto the peg 321 in such a way as to rotate with the latter.

By examining the figures of the drawing, it may be seen that the peg 321, together with the lever 32, can rock only when the flat 720 of the cam follower 72 is placed in the undercut 711 of the cam 71. For any other position of the cam follower 72 on the cam 71, the flat 720 in contact with the circular arc 710 prevents simultaneous rocking of the peg with its lever.

It will be noticed that the tongue 42, the member 51, at least in the part relating to its bottom limit stop 511 and the element 61 in the form of a protuberance are preferably produced as a single piece on the shaft 231 of the needle 23.

If required, and preferably, the lock also comprises an ejector 80 for, especially, automatically separating the striker plate 10 and the catch bolt 20 when the balls 22 are occupying their second position. The ejector 80 essentially comprises a sliding bush 81 carried by the body 21 with a notch 811 and groove 812, a spring 82, a spring cover 83 with a rim 831, a cap 84 with a rim 841 and an elastic clip 85 such as a circlip. The spring 82, preferably of the cylindrical helical or coil type, is engaged between the rims 831 and 841 of the spring cover 83 and of the cap 84, as is apparent by examining FIG. 3. This ejector 80 is kept under the first part 91 of the support 90 in such a manner as to be able to slide on the body 21 of the catch bolt 20.

Furthermore, a travel limiter 86 defines the amplitude of the axial translation of the sliding bush 81 on the locking body 21. This travel limiter 86 comprises a stud 861 carried by the bush 81 and a slot 862 made in the body 21. As may be seen, in particular in FIG. 3, the stud 861 is engaged in the slot 862 whose two extremities serve as limit stops for it.

Figure 4A:
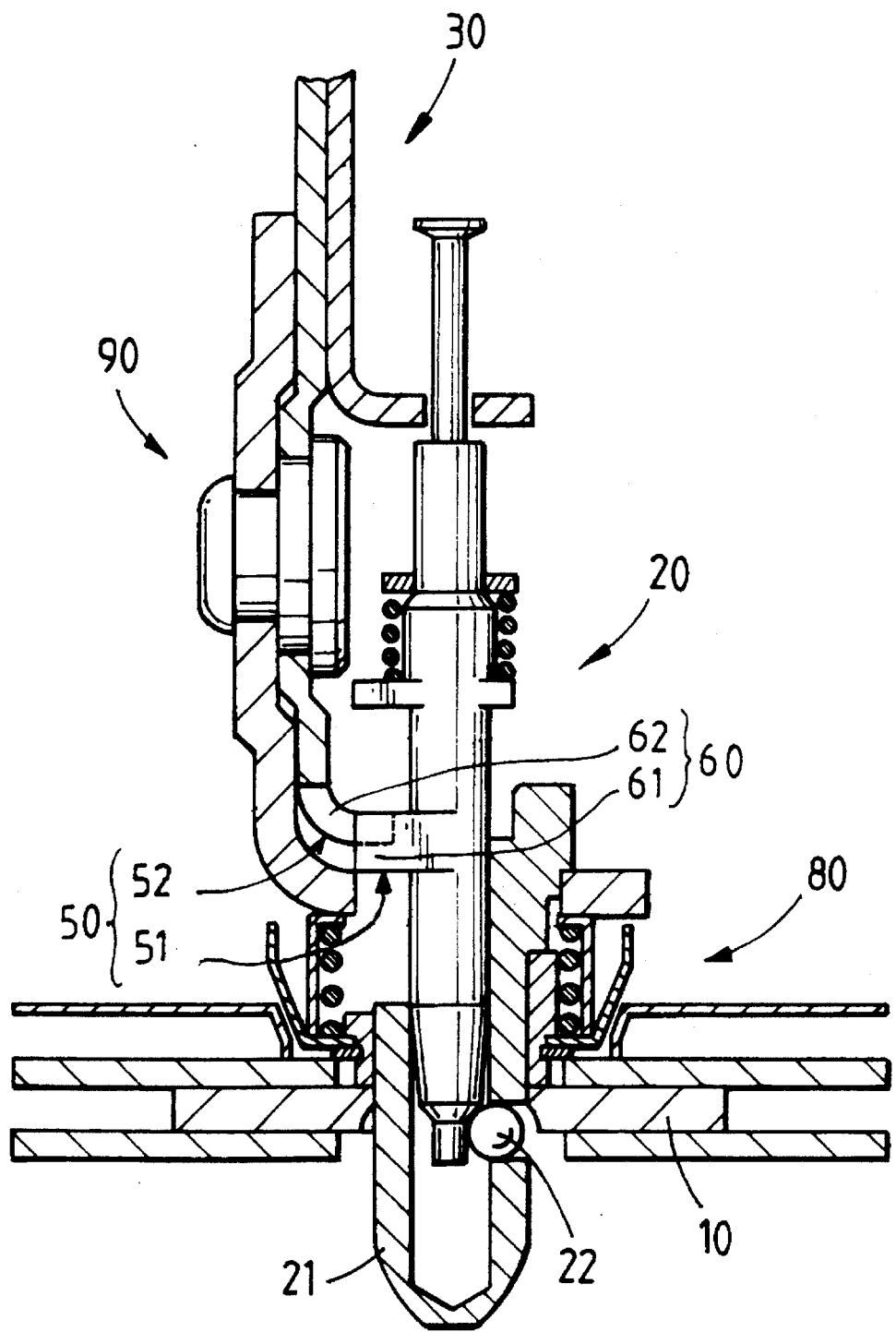
Figure 4E:
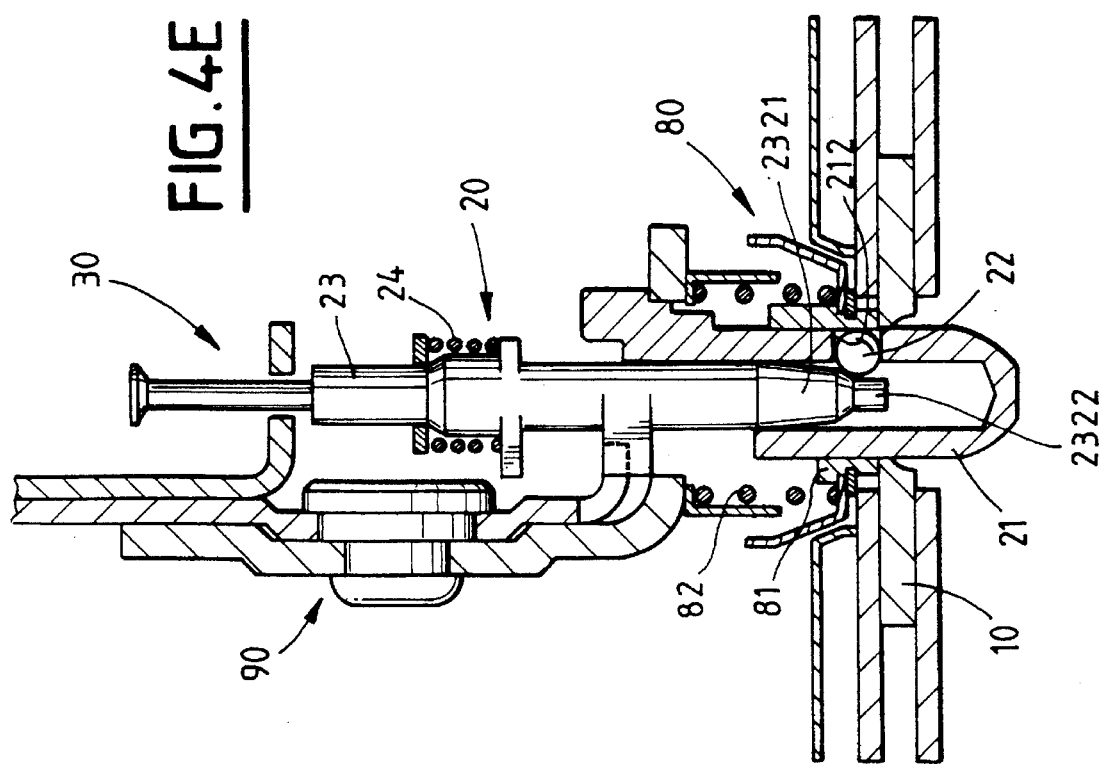

In the initial, normal, position, when the catch bolt 20 is not engaged in the striker plate 10, or is inserted only partially into the latter, not right in, it is understood that the spring 82 of the ejector 80 pushes the bush 81 back outwards, at its maximum extension (see FIG. 4E). At maximum extension, the bush 81 overlaps and then sits over the channels 212 and thereby prevents the balls 22 from projecting partially outwards from the body 21, in their first position, while at the same time also providing protection preventing the intrusion of foreign bodies. The needle 23, which is normally subjected to the action of the elastic urging member 24 towards its active position, then occupies a situation in which the large-angle region of its truncated cone 2321 and its pilot 2322 simultaneously rest against the balls 22: sliding of the needle 23 is thwarted and the latter cannot reach its active position. It is only when the bush 81 uncovers the channels 212, which it normally cuts off, that the balls 22 may in principle assume their first, projecting position and, in that way, "free" the needle which then reaches, in principle, its active position in which it confines the balls 22 in the active position, impeding them and preventing them from moving back into the channels 212 in the second, retracted position. It is therefore understood that the ejector can move between a blocking position towards which it is normally urged and in which it retains the balls in their second, retracted position and prevents the needle from reaching its active position and an unblocking position which it occupies in opposition to this urging member and in which it allows, in principle, the balls to assume their first, projecting position and frees the needle in order to enable it, in principle, to reach its active position.

All the components of a lock according to the invention are produced with the aid of conventional, preferably metallic, materials which are shaped and worked according to customary techniques.

All the components of a lock according to the invention are joined together, mounted and assembled as will emerge clearly from examining the figures of the drawing.

For reasons which will subsequently be apparent, it will only be pointed out that, preferably, the elastic urging member 24 develops lower forces than those generated by the ejector 80, the spring 82 of which is stronger than the spring of this elastic urging member.

The operation of this embodiment of the lock according to the invention will now be described.

When it is desired to lock the catch bolt onto the striker plate, all that is required is to press one towards the other;

the bush slides on the body, freeing the balls;

the balls may come out radially into their first position under the action of the truncated cone of the needle which engages in the body under the action of its elastic urging member in order to assume its active position;

the balls confined by the needle irreversibly lock the catch bolt relative to the striker plate.

This situation is illustrated in FIG. 4B.

The insertion, then engagement and locking of the catch bolt onto the striker plate are performed in opposition to the force developed by the spring of the ejector. In the case of application to a seat, the force of this spring is, at least in part, compensated for by the weight of the seat itself.

The foregoing shows that the catch bolt is automatically and rapidly latched or clicked in onto the striker plate, while at the same time protecting as far as possible the mechanisms which provide the locking.

In order to separate the catch bolt from the striker plate, all that is required is to unlock. The puller or the like is then actuated in order, for example, to cause the lever to rock which causes the needle to come out of the body in the inactive position, the lever, by means of its fork, bearing against the head of the outer end of the needle. In that way, the pilot of the needle is placed vertically above the channels of the body and the balls which are thus no longer confined can then be radially retracted into their second position, the spring of the ejector encouraging the disengagement of the body from the passage of the striker plate, on account of the existence of the chamfer or the like made in the contact area. The spring of the ejector replaces the sliding bush on the body so as to protect the mechanisms which contribute to the locking and, simultaneously to keep the balls in their second, retracted position in which they prevent the needle from passing into its active position of confining the balls.

The operation of the safety device and of the safety feature will now be explained.

As seen previously, the catch bolt of the lock is mounted fastened to a sole-plate, for example made from sheet metal bent into the form of a bracket, on which the leg of the seat is articulated. The leg is fitted with the stop-piece obtained with the aid of a bent-over edge in the form of a circular arc centred on the pin of the articulation. This stop-piece is intended to interact with the limit stops of the needle in the event of incorrect clicking-in so as to serve as position detector or indicator, and likewise to prevent the use of the seat.

It will be recalled that the position chosen for the seat in the phases of locking and unlocking the lock is the one in which it is folded or folded up, tilted forwards for example, in which position the seat cushion is virtually vertical, approximately parallel to the backrest of the seat. It will be noticed that the stop-piece is then out of the area of the limit stops of the needle (see FIGS. 4B or 4C).

In order to lock the seat onto the floor, the procedure is as indicated previously.

If no difficulty is encountered, such as the presence of foreign bodies, dirt or the like, the locking is performed normally and automatically as previously explained. It may then be seen (FIGS. 4B or 4C) that the stop-piece can find a free passage between the two limit stops of the needle and that it can cause the leg to be tilted relative to its sole-plate in order to extend the seat and to open it out into the "travelling" position for which an occupant may be seated thereon.

Figure 5A:
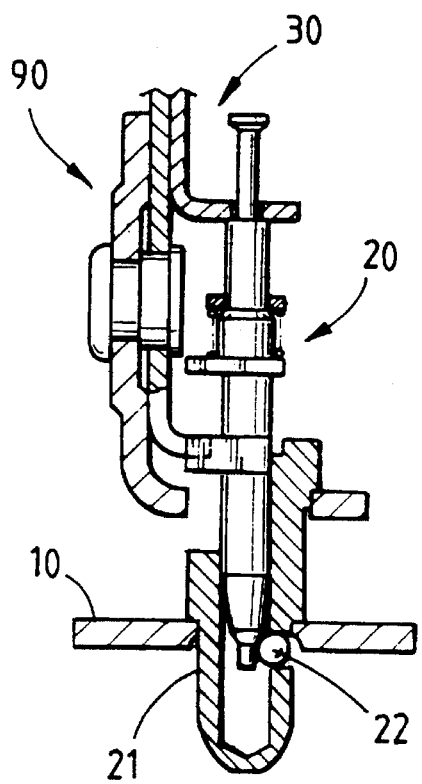
FIGS. 5A, 5B, 5C and 5D are views analogous to the corresponding views of FIG. 4 of another, simplified embodiment.

On the other hand, if difficulties are encountered which are due to objects or other items of dirt which prevent the balls, freed by the ejector, from coming out, the situation is that illustrated in FIG. 4A or 5A. It is then impossible for the needle to be engaged further forwards into the cavity of the body in order to assume its active position, and it therefore cannot cause the balls to project in their first position under the thrust of the truncated cone, so as to lock the catch bolt onto the striker plate. In such a situation, the "bottom" limit stop of the needle is placed in the path of the stop-piece which it intercepts. The "bottom" limit stop thus opposes the tilting, and the rotation of the leg, preventing the seat from being put into the opened-out or travelling position. It will be noticed that the limit stops are engaged in the groove 41, of matching shape, in the body so as to oppose, with considerable resistance the forces involved.

Such a situation corresponds to the case in which the user might believe that installation and locking of the lock are correct, in the absence of the safety device. This is because, only the installation, that is to say the insertion of the catch bolt into the opening of the striker plate, is correct, the body being lowered well into the opening of the striker plate without, however it being possible for locking to have actually taken place.

Another source of difficulty occurs when foreign bodies lie interposed between the cap of the ejector and the striker plate. This situation is the one illustrated in FIG. 4D. In such circumstances, a foreign body causes the bush of the ejector to move back and therefore free the balls to be freed into their first, projecting position but in front of the striker plate, that is to say on its bearing face side, without complete engagement of the body of the catch bolt in the striker plate. The body cannot come down into the opening without the user necessarily being aware of this. In this case, the needle comes down to the bottom of travel in the cavity of the body, to the end of travel from its active position, and it is its "top" limit stop which then intercepts the path of the stop-piece. It is now this "top" limit stop which, as previously, prevents the seat from being put into the opened-out position.

The manner whereby the clearances due to the manufacturing tolerances or to the operational wear are taken up or compensated for will now be explained.

As explained previously, the needle 23 has an inner end with a pilot and an area in the form of a truncated cone with two regions of different angles, the region extending the truncated cone in the direction of the cylindrical shaft having a very small angle, as clearly illustrated in the figures of the drawing.

When the balls are in their second, completely retracted position, whether in the normal situation before locking or consequent upon any blockage after the catch bolt has been installed on the striker plate, these balls bear against that region, connected to the pilot, which has the larger angle. In this situation the balls prevent the needle from being engaged further forward, into the active position, in the cavity of the body and thus prevent the seat from being opened-out into the "travelling" position on account of the action of the "bottom" limit stop of the needle (FIGS. 4A, 5A).

Conversely, when the balls occupy their first position, in which they are virtually totally out, whether as a result of the bush of the ejector moving back due to a foreign body (FIGS. 4D, 5D) or alternatively as a result of apparently correct locking, but on too great a contact area of the opening of the striker plate, which situation is not illustrated, in which the balls then project, in their first position, from the locking face side of the striker plate, but provide unsatisfactory locking because of the presence of play. The balls then bear against the cylindrical shaft of the needle which has reached the extremity of its travel in the active position. The "top" limit stop of the needle then prevents the seat from being tilted into its "travelling" opened-out position, as indicated previously.

Between these two extreme positions, and to provide correct locking, therefore to allow the seat to be tilted into the opened-out or "travelling" position, the balls absolutely must be projecting, bearing against that region of the truncated cone of the needle which has a small angle, in their first position.

It may therefore be seen that that region of the truncated cone which has a small angle is intended to compensate for the variations in diameter of the needle and of the contact area, these being due to the manufacturing tolerances or to operational wear.

Figure 5B:
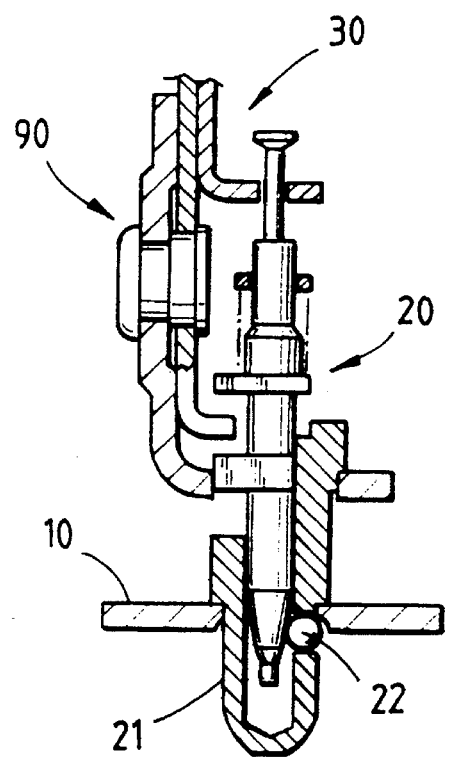
Figure 5C:
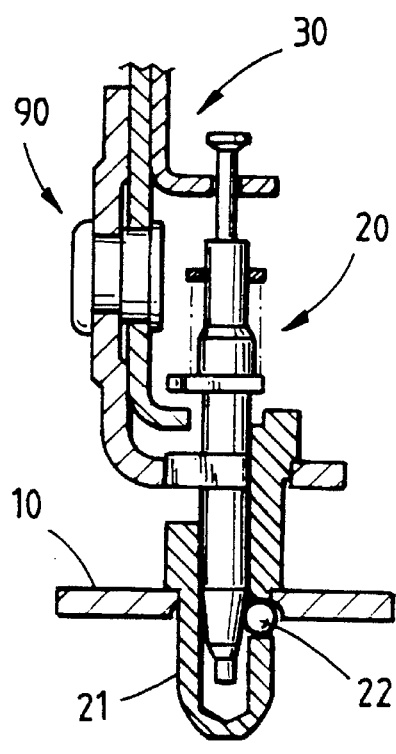

Indeed, in the case in which the needle has the maximum diameter and the contact area of the striker plate has the minimum size, the needle is engaged to a very small extent in the cavity of the body while at the same time allowing movement of the leg whose stop-piece passes between the two limit stops of the needle (FIG. 4B or 5B). In the reverse case, in which the needle has a minimum diameter and the contact area of the striker plate has the maximum size, the needle is engaged further into the cavity of the body, but still enables the stop-piece to move between the two limit stops of the needle (FIG. 4C or 5C).

Figure 4D:
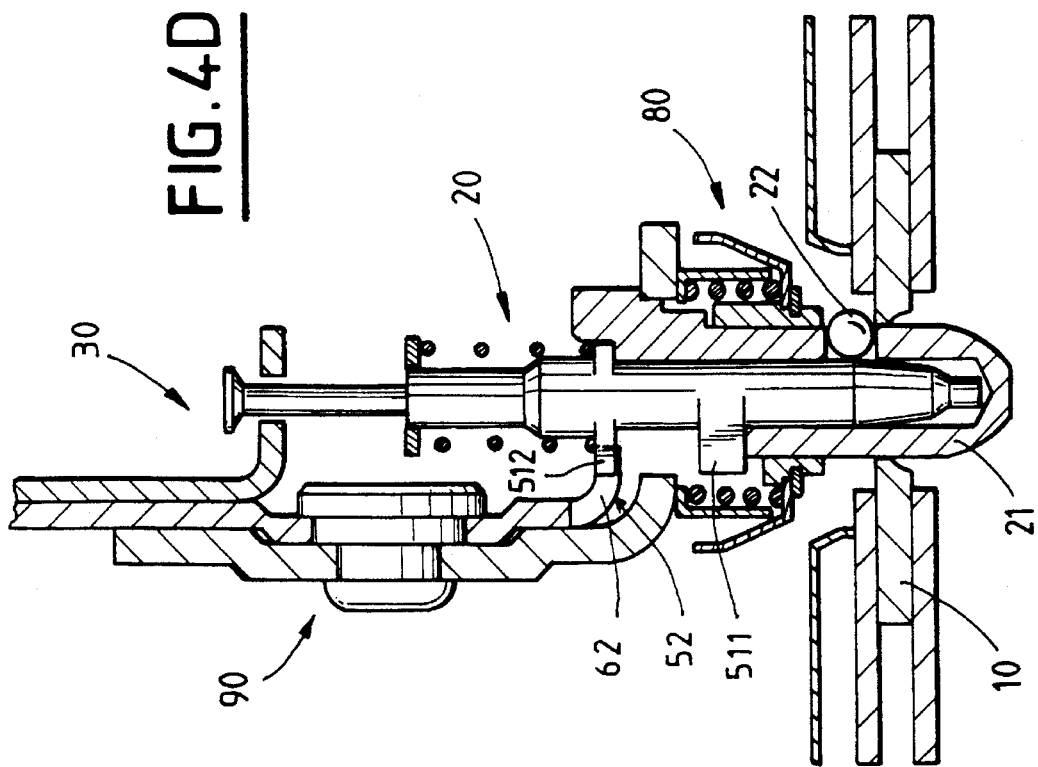
Figure 5D:
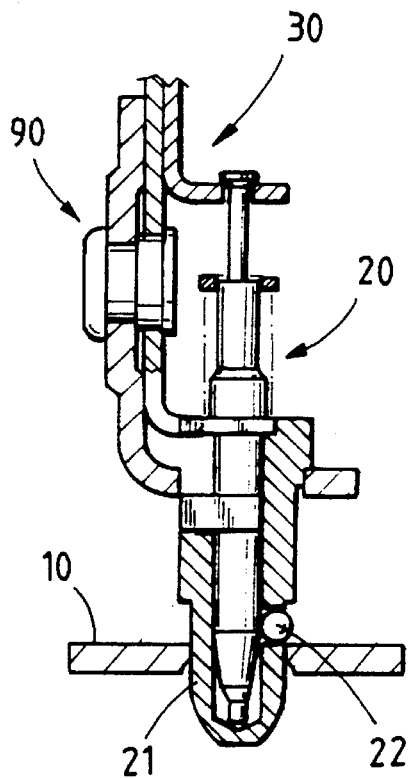

This technique of taking up the tolerances makes it possible to compensate for the possible wear of the functional components, especially the needles, and/or the opening of the striker plate, up to a certain threshold above which the needle penetrates virtually right into the cavity of the body, in which situation the balls bear on the cylindrical shaft of the needle (FIG. 4D or 5D). In this situation, as indicated previously, the seat is prevented from being put into the opened-out or "travelling" position. This is because otherwise the locking obtained, of the catch bolt onto the strike plate, would run the risk of being doubtful or a source of noise because of the existence of residual play. This therefore forms an indicator or warning which indicates that a wear limit has been reached or even exceeded., From the foregoing, it is also clear that it is possible to actuate the puller, or the like, of the control device only when the seat is opened-out, the catch bolt being locked onto the striker plate, as illustrated in FIGS. 4B, 4C or 5B, 5C, since the cam follower can then rock in the undercut located at the extremity of the cam. Otherwise, the lever is kept immobilized by means of the flat bearing against the circular arc, preventing it from rocking. It is therefore also clear that the control device, which is disconnected when the seat occupies a folded or folded-up position, other than the opened-out position, is, every time, totally ineffective since the fork has been separated from the outer end of the needle. Conversely, when the seat is tilted from its folded or folded-up position into its opened-out or "travelling" position, the lever, kept immobile and following the leg in its relative tilting with respect to the sole-plate, still has a correct-position orientation in order to straddle the outer end and, subsequently, be freed only at the end of travel in order to be able to rock under the action of the puller.

It is clear that, for the application of a lock according to the invention to a seat subframe, it is possible to equip one, several or all the legs with such a lock. In such a case, the control device is adapted so that it acts simultaneously on all the locks in such a manner as to be able to unlock them all together by a single manoeuvre. Likewise, it is clear that the control device can be motorized.

Likewise, so as to prevent the penetration of foreign bodies into the opening of the striker plate which would not fail to disrupt or to disturb the operation of the lock according to the invention, it is possible to fit the striker plate with one or more movable flaps, having automatic return into the position for closing off the opening in order to keep the latter closed in the absence of the catch bolt. This type of flap is conventional on lock mechanisms, especially the lock mechanisms of doors of land-going motor vehicles.

If necessary, a suitable protector P, made from synthetic material for example, "covers" the lock.

The above elucidates the distinctive features of the invention as well as its benefit, and the advantages which it provides.

What is claimed is:

1. An arrangement of a lock in a seat for a motor vehicle provided with a floor, the seat comprising a subframe having first and second parts (91, 92) joined together by an articulation (93), the first part forming a sole-plate and the second part (92) forming a leg, the second part (92) being able to move, relative to the first part (91), between an opened-out position and a folded position, the lock comprising a catch bolt (20) having a locking body (21) forming a broach intended to be latched in an opening (111) formed in a striker plate (10), the locking body (21) being supported by the first part (91) and the striker plate (10) being fixed to the floor, the arrangement comprising a safety device allowing the latching or the release of the locking body (21) only when the second part (92) is in the open-out position, wherein the locking body (21) comprises a cylindrical guide cavity (210), an open extremity (211) and at least one channel (212) transpiercing the locking body (21) in order to come out into the cavity (210), wherein the catch bolt (20) comprises further at least one ball (22) housed in the channel (212) and movable between a first projecting position so as to be in contact with the striker plate in order to lock the catch bolt (20) and a second retracted position so as to unlock the catch bolt (20), a needle (23) housed in the cavity (210) and movable be means of a control device (30) between an inactive position and an active position in order to cause the ball (22) to pass from one of its positions to the other, and wherein, the safety device (60) comprises two interacting elements (61, 62), a first one (62) carried by the second part (92) and a second one (61) carried by the needle (23).

2. The arrangement according to claim 1, wherein the first element (62) is a stop-piece centred on the articulation (93) and the second element (61) is a protuberance.

3. The arrangement according to claim 1, wherein the control device (30) is joined to the needle by disconnectable means, and wherein an elastic urging member (24) is interposed between the body (21) and the needle (23) in order to urge the latter in its active position and place the ball (22) in its first position, the control device (30) acting in opposition to the elastic urging member (24) so as to place the needle in its inactive position in order to allow the ball (22) to pass from its second to its first position.

4. The arrangement according to claim 3, wherein the disconnectable means comprises a rocking lever (32) which is clamped onto a peg (321) swivelling freely on the second part (92) and provided with an open fork (322) intended to receive an outer end (233) of the needle (23), and a puller (31) connected to the lever (32) in order to make it rock in opposition to the elastic urging member (24).

5. The arrangement according to claim 1, wherein the lock comprises further a safety feature (70) which neutralizes the control device (30) in order to prevent the release of the lock when the second part (92) is not in its opened-out position.

6. The arrangement according to claim 5, wherein the control device (30) is joined to the needle by disconnectable means, wherein an elastic urging member (24) is interposed between the locking body (21) and the needle (23) in order to urge the latter in its active position and place the ball (22) in its first position, the control device (30) acting in opposition to the elastic urging member (24) so as to place the needle in its inactive position in order to allow the ball (22) to pass from its second to its first position, wherein the disconnectable means comprises a rocking lever (32) which is clamped onto a peg (321) swivelling freely on the second part (92) and provided with an open fork (322) intended to receive an outer end (233) of the needle (23), and a puller (31) connected to the lever (32) in order to make it rock in opposition to the elastic urging member (24), and wherein the safety feature (70) comprises a cam (71) and a cam follower (72), the cam (71) being carried by the first part (91) and being defined by a circular arc (710) centred on the articulation (93) with an undercut (711) at one of its extremeties, the cam follower (72) being defined by a flat (720) of the peg (321).

7. The arrangement according to claim 1, wherein the lock comprises an ejector (80) for contributing to the separation of the striker plate (10) and the catch bolt (20) when the ball (22) is in its second position and which can move between a blocking position towards which it is normally urged by an urging member (82) and in which it retains the ball (22) in its second retracted position and prevents the needle (23) from reaching its active position, and an unblocking position which it occupies in opposition to said urging member and in which it allows the ball (22) to assume its first projecting position and frees the needle (23) in order to allow it to reach its active position.

8. The arrangement according to claim 7, wherein the ejector (80) comprises a sliding bush (81) carried by the locking body (21), a spring (82) urging the bush towards the blocking position and a travel limiter (86).

9. The arrangement according to claim 8, wherein the ejector (80) comprises a spring a cover (83) and a cap (84) wherein the spring (82) is engaged between the cover and the cap.

10. The arrangement according to claim 1, wherein the lock comprises an orientation device (40) for keeping the body (21) and the needle (23) rotationally relatively fixed.

11. The arrangement according to claim 10, wherein the orientation device (40) is formed by a groove (41) and a tongue (42) which are carried, one by the body (21) and the other by the needle (23).

12. The arrangement according to claim 1, wherein the lock comprises a detector (50) for detecting the position of the needle (23), formed by a movable member (51) which is carried by the needle (23), and by a reference member (52) which is placed on the path of the movable member (51) and carried by the second part (92), so as to indicate either a) that the catch bolt (20) is completely engaged in the striker plate (10) without being locked therein, the needle (23) in the inactive position not driving the ball (22) from its first position, or b) that the catch bolt (20) is incompletely engaged in the striker plate (10) and is locked, the needle (23) in the active position driving the ball (22) into its first position.

13. The arrangement according to claim 12, wherein the movable member (51) carried by the needle (23) is a limit stop made on a cylindrical shaft (231) of the needle and the reference member (52) is a stop-piece.

14. The arrangement according to claim 13, wherein the limit stop (51) is duplicated and comprises a bottom limit stop (511) for indicating the inactive position of the needle (23) and a top limit stop (512) for indicating the active position of the needle (23).

15. The arrangement according to claim 1, wherein the lock comprises an orientation device (40) for keeping the body (21) and the needle (23) rotationally relatively fixed, wherein the orientation device (40) is formed by a groove (41) and a tongue (42) which are carried, one by the body (21) and the other by the needle (23), wherein the lock comprises a detector (50) for detecting the position of the needle (23), formed by a movable member (51) which is carried by the needle (23), and by a reference member (52) which is placed on the path of the movable member (51) which is carried the second part (92), so as to indicate either a) that the catch bolt (20) is completely engaged in the striker plate (10) without being locked therein, the needle (23) in the inactive position not driving the ball (22) from its first position, or b) that the catch bolt (20) is incompletely engaged in the striker plate (10) and is locked, the needle (23) in the active position driving the ball (22) into its first position, wherein the tongue (42), is carried by the needle (23), and wherein the tongue (42), in part the movable member (51) and the second element (61) are made as a single piece.

16. The arrangement according to claim 1, wherein the needle (23) comprises an inner end (232) formed by a truncated cone (2321) having two successive regions of different respective angles in order to compensate for the clearance between the striker plate (10) and the catch bolt (20).

* * * * *